United States Patent [19]

Keyser et al.

[11] Patent Number: 4,944,776

[45] Date of Patent: Jul. 31, 1990

[54] DEHUMIDIFIER FOR WAVEGUIDE SYSTEM

[75] Inventors: Lloyd A. Keyser, Dallas; Donald A. Nelson, Allen; David C. Thornton, Grapevine, all of Tex.

[73] Assignee: Andrew Corporation, Orland Park, Ill.

[21] Appl. No.: 417,595

[22] Filed: Oct. 5, 1989

[51] Int. Cl.$^5$ .............................. B01D 53/22
[52] U.S. Cl. ................................ 55/16; 55/21; 55/68; 55/158
[58] Field of Search ................ 55/16, 21, 68, 158

[56] References Cited

U.S. PATENT DOCUMENTS

| | | | |
|---|---|---|---|
| 3,133,132 | 5/1964 | Loeb et al. | 264/49 |
| 3,499,062 | 3/1970 | Geary et al. | 264/36 |
| 3,536,611 | 10/1970 | DeFilippi et al. | 210/22 |
| 3,556,305 | 1/1971 | Schorr | 210/490 |
| 3,556,992 | 1/1971 | Massucco | 210/23 |
| 3,580,841 | 5/1971 | Cadotte et al. | 210/23 |
| 3,615,024 | 10/1971 | Michaels | 210/490 |
| 3,616,507 | 11/1971 | Klass et al. | 55/16 |
| 3,657,113 | 4/1972 | Stancell et al. | 210/23 |
| 3,676,203 | 7/1972 | Sachs et al. | 117/123 D |
| 3,735,559 | 5/1973 | Salemme | 55/16 |
| 3,775,303 | 11/1973 | McKinney et al. | 208/210 |
| 3,775,308 | 11/1973 | Yasuda | 210/23 |
| 3,874,986 | 4/1975 | Browall et al. | 161/160 |
| 3,892,665 | 7/1975 | Steigelmann et al. | 210/490 |
| 3,899,309 | 8/1975 | Hoehn et al. | 210/500 |
| 3,922,149 | 11/1975 | Ruder et al. | 55/21 |
| 3,926,798 | 12/1975 | Cadotte | 210/23 |
| 3,980,456 | 9/1976 | Browall | 250/500 |
| 4,108,765 | 8/1978 | Lee | 210/23 |
| 4,142,966 | 3/1979 | Perry | 210/22 |
| 4,157,960 | 6/1979 | Chang et al. | 210/23 |
| 4,218,312 | 8/1980 | Perry | 210/22 |
| 4,230,463 | 10/1980 | Henis et al. | 210/500 |
| 4,311,594 | 1/1982 | Perry | 210/640 |
| 4,421,529 | 12/1983 | Revak et al. | 55/21 X |
| 4,472,175 | 9/1984 | Malon et al. | 55/16 |
| 4,472,176 | 9/1984 | Rubin | 55/16 |
| 4,486,202 | 12/1984 | Malon et al. | 55/158 |
| 4,497,640 | 2/1985 | Fournie et al. | 55/16 |
| 4,549,888 | 10/1985 | Fannin | 55/21 X |
| 4,575,385 | 3/1986 | Brooks et al. | 55/158 |
| 4,583,996 | 4/1986 | Sakata et al. | 55/16 |
| 4,597,777 | 7/1986 | Graham | 55/16 |
| 4,614,524 | 9/1986 | Kraus | 55/16 |
| 4,654,055 | 3/1987 | Malon et al. | 55/158 |
| 4,685,941 | 8/1987 | Sato | 55/21 X |
| 4,687,578 | 8/1987 | Stookey | 210/321 |
| 4,710,204 | 12/1987 | Kraus et al. | 55/16 |
| 4,718,921 | 1/1988 | Makino et al. | 55/16 |
| 4,728,345 | 3/1988 | Murphy | 55/158 |
| 4,857,082 | 8/1989 | DiMartino, Sr. et al. | 55/16 |

FOREIGN PATENT DOCUMENTS

| | | | |
|---|---|---|---|
| 63-123418 | 5/1988 | Japan | 55/16 |
| 01-143624 | 6/1989 | Japan | 55/16 |
| 01-143625 | 6/1989 | Japan | 55/16 |
| 01-143626 | 6/1989 | Japan | 55/16 |

*Primary Examiner*—Robert Spitzer
*Attorney, Agent, or Firm*—Arnold, White & Durkee

[57] ABSTRACT

A dehumidifying system uses a membrane cartridge to filter water vapor from air or other gas introduced into the membrane cartridge via a main pump or compressor. Dehumidified gas from the membrane cartridge is then delivered into a system which requires dry gas. The dehumidifying system further includes valve arrangements or additional compressors which provide gas flow through the membrane cartridge when the main compressor is inactive. Therefore, the membrane cartridge receives a substantially continuous flow of gas which maintains the optimal efficiency of the membrane cartridge. In addition to the arrangements which provide this continuous gas flow, a heating coil wrapped around the membrane cartridge raises the temperature of the fiber membranes within the cartridge. The heated fiber membranes are less susceptible to retain moisture which decreases the efficiency of the membrane cartridge.

42 Claims, 2 Drawing Sheets

DEHUMIDIFIER FOR WAVEGUIDE SYSTEM

BACKGROUND OF THE INVENTION

1. Field of the Invention

This invention relates generally to dehumidifiers, and more particularly to a dehumidifier that uses a membrane cartridge for dehumidifying air and other gases.

2. Description of the Related Art

Dehumidifying systems are used in a variety of different applications. For example, air dehumidifying systems are used in applications ranging from dehumidification of offices for maintaining comfortable working areas during summer months to providing dry air for dental tools. Different applications often require different levels of humidity A humidity level of about 40% to 60% is comfortable in homes or offices, while a humidity level of less than 10% is desirable in certain laboratory situations. Even lower humidity levels are often desirable in communications systems.

Commonly used signal transmission media in communications systems are waveguide, coaxial cable, multi-wire telephone cables, and optical fiber cables. Changing environmental conditions can affect the overall performance of a system using any of these media. For example, when the temperature of air inside a waveguide or other transmission medium falls below its dew point, condensation occurs inside the transmission line. Condensation lowers the efficiency of waveguide and coaxial cable systems partially because the dielectric constant of water is greater than the dielectric constant of air, and partially because the condensation alters the impedance of the waveguide or coaxial cable and may produce signal variation or loss. In multiwire cables, condensation can lower the insulation resistance and introduce undesirable leakage paths.

To prevent the accumulation of moisture in such systems, the transmission line is normally sealed and pressurized to prevent the ingress of moisture through any small gaps. To prevent condensation within the system, the pressurization is effected with dry air from a dehumidifier or dehydrator. A compressor or pump typically supplies the pressurized air, and the dehumidifying apparatus removes moisture from the pressurized air before it is injected into the system. The low moisture content of the air lowers the dew point so that condensation does not take place except at very low temperatures. Moreover, due to the small amount of moisture present in the injected air, only a small amount of condensate can form even at unusually low temperatures.

One type of dehumidifier is commonly referred to as a desiccant dryer. Typically, a desiccant container holds a hydroscopic agent, such as silica gel, calcium oxide or sulfuric acid, and a gas such as air is pumped through the container. Since the desiccant has a great affinity for water, moisture within the air is attracted to the desiccant. Therefore, gas leaving the container contains little moisture. However, the hydroscopic agent eventually becomes saturated or ineffective and requires regeneration or replacement. Due to this shortcoming, continual operation is impossible where only one desiccant container is used. Moreover, many of the hydroscopic agents, such as sulfuric acid, are hazardous and expensive.

Another type of dehumidifier is commonly referred to as a refrigerant dryer Refrigerant dryers cool a compressed gas below the ambient temperature so that moisture in the compressed gas condenses on refrigerated coils. In contrast to desiccant dryers, refrigerant dryers have the advantage of being able to continually remove moisture from the gas. However, refrigerant dryers require large quantities of energy, and dehumidification of gases to low humidity levels is difficult.

Another type of dehumidifier, commonly referred to as an automatic pressure-sensing regenerative dryer, uses two cylindrical towers containing molecular sieve material. The two towers are alternately cycled so that while one chamber is drying the gas passing through it, the other chamber is being purged of accumulated moisture These two towers vent to the atmosphere through a solenoid valve activated by a timing motor. This type of dryer is inherently noisy and requires a considerable number of electro-mechanical parts, which reduces the reliability of the system.

It has also been known that gases can be dried by passing them through a membrane cartridge containing multiple membranes through which moisture, but not the gas being dried, can permeate and escape to the atmosphere or a collection system. The membranes in such cartridges, which are commercially available, are typically in the form of hollow fibers so that a gas may be passed through the interiors of the fibers while moisture removed from the gas is collected from the exteriors of the fibers.

A problem with these membrane cartridges, however, is that the membranes absorb moisture and lose their effectiveness when the compressor or other source of pressurized air is turned off. In the case of pressurized waveguide systems, for example, the compressor is normally off for much longer periods than it is on, because it is supplying pressurized air to a sealed system. When a membrane cartridge is used in such a system, the membranes must be dried to restore its effectiveness each time the compressor is turned on; this restoration time is sufficiently long, typically 20 minutes or more, that it seriously degrades the efficiency of the pressurization-dehumidification system.

The present invention is directed to overcoming one or more of the problems as set forth above.

SUMMARY OF THE INVENTION

It is a primary object of the present invention to provide an improved gas pressurization-dehumidification system using a membrane cartridge and a pressurized gas source which can be operated intermittently without any significant degradation of the moisture-removing membranes during the periods when the pressurized gas source is turned off.

It is another important object of the present invention to provide such an improved gas pressurization-dehumidification system which enables membrane cartridges to be used for moisture removal without detracting from the overall operating efficiency of the system.

A further object of the present invention to provide such an improved gas pressurization-dehumidification system which uses a relatively small amount of energy.

It is yet another object of the present invention to provide such an improved gas-pressurization-dehumidification system which does not require frequent regeneration or replacement of any part of the system.

It is a further object of the present invention to provide such an improved system which can be economically fabricated and efficiently operated.

A still further object of the present invention is to provide a system which is particularly suitable for supplying pressurized-dehumidified air into sealed systems such as waveguide systems.

Other objects and advantages of the invention will become apparent upon reading the following detailed description and upon reference to the accompanying drawings.

In accordance with the present invention, the foregoing objectives are realized by providing a gas pressurization-dehumidification system comprising a primary gas source for supplying pressurized gas; a membrane cartridge having an inlet for receiving pressurized gas from the primary gas source and an outlet for supplying dehumidified, pressurized gas to a selected space, the cartridge having membranes which remove water vapor contained in the gas through the membranes, and a second outlet for ejecting water vapor from the cartridge; control means for repetitively energizing and deenergizing the primary gas source so that the pressurized gas is supplied intermittently to the selected space; and a secondary gas source for supplying gas to the membrane cartridge when the primary gas source is de-energized so as to maintain the effectiveness of the membranes during the periods of de-energization of the primary gas source.

In a preferred embodiment, the primary gas source is a compressor which is intermittently switched between on and off states in order to conserve energy. Additional energy is conserved by cycling the compressor in accordance with the pressure level within the dry gas system. Dehumidified gas is routed into the dry gas system until the pressure level within the system rises above a first predetermined setpoint. Then, the compressor turns off. Gas is passed back through the membrane cartridge by allowing gas within the system to seep back into the cartridge or by using a smaller pump or compressor to route gas into the cartridge. After the pressure level within the system falls below a second predetermined setpoint, the compressor again turns on, and dehumidified gas is again routed into the dry air system.

Figure 4:
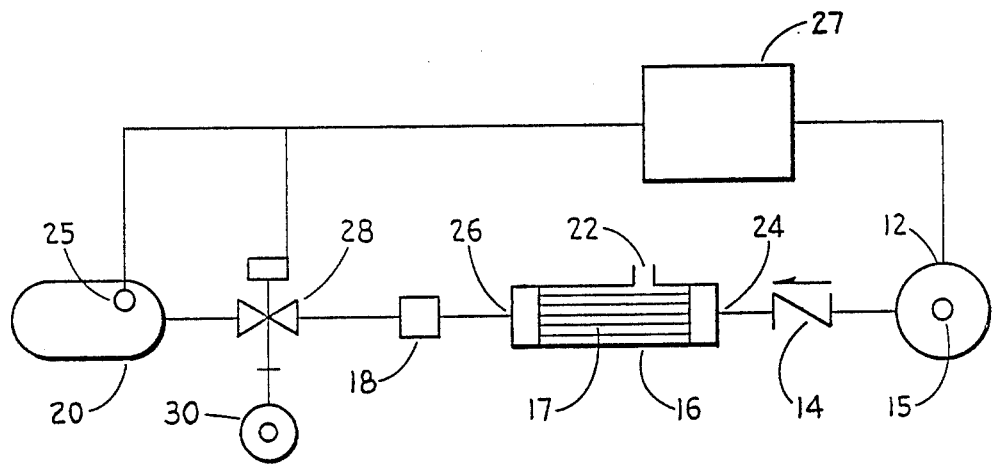
FIG. 4 is a diagrammatic illustration of a dehumidifier in accordance with the present invention which includes a secondary compressor.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Figure 1:
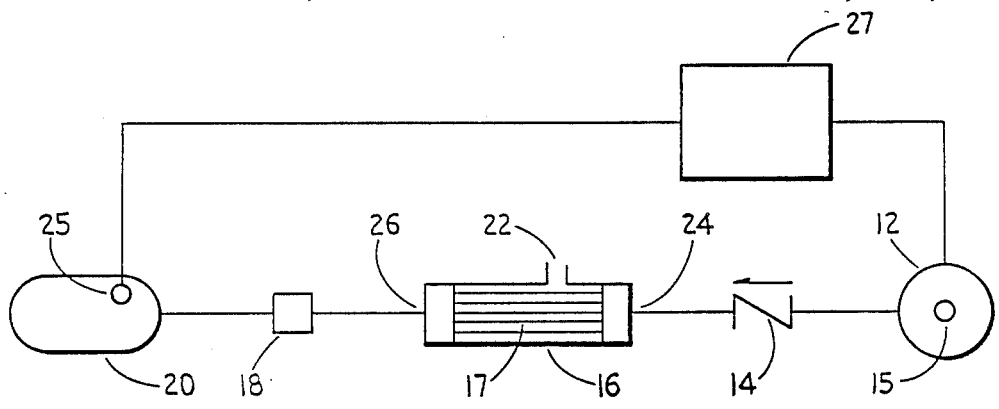
FIG. 1 is a diagrammatic illustration of a dehumidifier in accordance with the present invention.

Referring initially to FIG. 1, a dehumidification system is illustrated and generally designated by a reference numeral 10. This system will be described herein with specific reference to the dehumidification of air, but it will be understood that the system is generally applicable to the dehumidification of other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane.

An air compressor or pump 12 pressurizes air from the atmosphere which enters the compressor 12 through an inlet 15. The pressurized air is routed through a check valve 14 to a membrane cartridge 16. The membrane cartridge 16 removes moisture from the pressurized air and routes the dehumidified air through a flow control valve 18 to the inlet of a dry air system 20.

The membrane cartridge 16 utilizes hollow fiber membranes 17 to separate water vapor from air and expel it from the cartridge as water vapor. The hollow fiber membranes 17 allow certain gases to permeate through the fiber and escape, while other gases continue through the hollow portion of the fiber. The hollow fiber membranes extend from a cartridge inlet 24 to a cartridge outlet 26 so that only air which travels within the hollow of the fibers 17 is available for induction into the dry air system 20. Gases, such as water vapor, which permeate through the fiber, exit the cartridge 16 through a weep hole 22.

The preferred membrane cartridge is commercially sold under the tradename "Prism Cactus" by Permea Inc., Malvern Industrial Park, Box 396, Malvern, Pa. 19355. Using this type of membrane cartridge, gases such as water vapor, hydrogen, helium and carbon dioxide permeate the fiber membrane quickly, while gases such as carbon monoxide, nitrogen and methane permeate the fiber membrane slowly. Therefore, the flow rate through the membrane cartridge is chosen so that unwanted gases, in this case water vapor, are filtered out. Of course, the flow rate also depends upon the size and the length of the membrane cartridge. With a given flow rate, more gases are filtered out of air traveling through a long membrane cartridge than through a relatively short membrane cartridge because the gases are within the longer cartridge for a greater period of time.

Preferably, the system 20 is a sealed system, such as a waveguide system (or other signal transmission media), so the induction of the pressurized dehumidified air pressurizes the system 20. A pressurized system prevents humid atmospheric air from seeping into the system, and, thus, preserves the low humidity level of the air within the system. Since the dehumidified air cannot rapidly escape from the sealed system 20, the compressor 12 does not need to operate continuously in order to effectively dehumidify the air contained within the system.

Therefore, in order to optimize the efficiency of the dehumidifying system 10, the compressor 12 is operated intermittently. This intermittent operation may be cyclical using a simple control which automatically switches the compressor 12 on and off at regular time intervals. Alternatively, a pressure sensor 25 within the system 20 may be used to switch the compressor on and off via control 27. When the pressure level in the system 20 falls below a predetermined set point, the control 27 delivers an activating signal to the compressor 12, and, thus, dehumidified air is delivered to the system 20. After the pressure level reaches an acceptable level, the control 27 delivers a deactivating signal to the compressor 12, and, therefore, energy used by the system 10 is conserved. If the system 20 is a waveguide system, the compressor 12 is typically turned off when the pressure within the waveguide reaches about 8 p.s.i., and the compressor is re-activated when the pressure falls below about 3 p.s.i. The lower setpoint of 3 p.s.i. insures that under extreme environmental conditions the waveguide system will not draw a vacuum which would bring in humid air from the atmosphere.

However, a problem arises with the use of the membrane cartridge 16 in a dehumidifying system which operates intermittently. Allowing the membrane cartridge to remain inactive for relatively short periods can severely reduce the ability of the membrane to extract water vapor from air. For example, a one-hour period of inactivity for the "Prism Cactus" cartridge mentioned above can reduce the ability of that cartridge to instantly extract water vapor from air by 15% to 20%. When the compressor is turned on again, the effectiveness of the membrane cartridge is gradually restored, but periods of 20 minutes or more can be required to return an inactive membrane cartridge to optimal performance. It is believed that this decrease in efficiency is caused by the membrane fibers absorbing moisture from their surroundings. Frequent pressurization is required to keep the fibers sufficiently dry and active for optimal performance. Compressor operation produces a "forward" flow of air through the membrane cartridge and into the system. Therefore, the membrane cartridge 16 remains active when the compressor 12 is running.

To keep the membrane cartridge 16 active while the compressor 12 is inactive, the flow control valve or orifice 18 allows the pressurized air within the dry air system 20 to flow "backward" into the membrane cartridge 16. Since the check valve 14 prevents air flow from the membrane cartridge 16 into the compressor 12, air from the waveguide system 20 which flows into the outlet 26 flows out through the hollow fiber membranes and the weep hole 22. This continuous flow of air keeps the membrane cartridge 16 active and operating at optimal efficiency during the intermittent cycling of the compressor 12. Moreover, the air within the system which seeps back through the membrane cartridge 16 is further dehumidified by the membrane cartridge 16.

Figure 2:
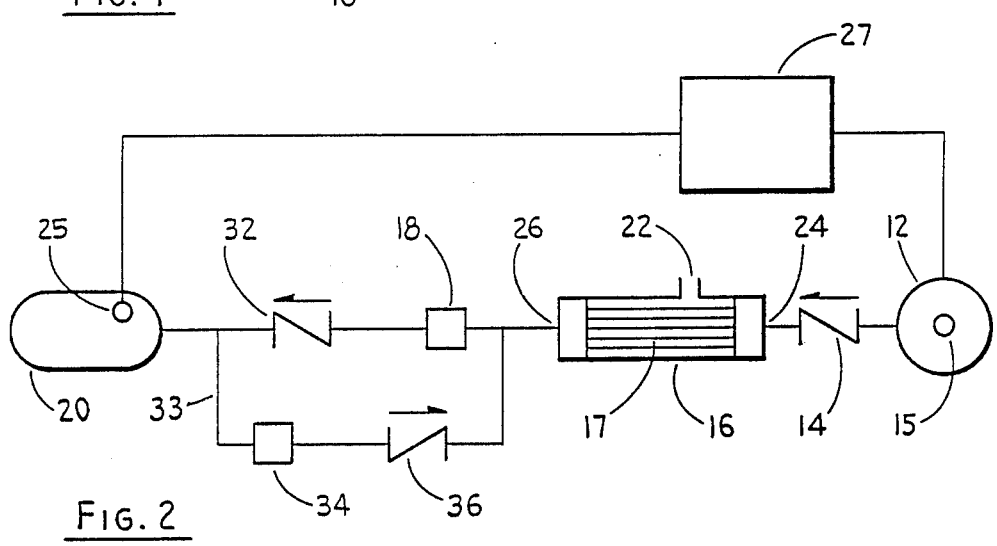
FIG. 2 is a diagrammatic illustration of a dehumidifier in accordance with the present invention which includes an auxiliary flow path.

A modification of the system of FIG. 1 is shown in FIG. 2. Since the system 10 of FIG. 1 uses dehumidified air from the dry air system 20 to keep the membrane cartridge 16 active, the system 20 requires frequent replenishment of dehumidified air. To reduce the amount of dehumidified air which passes from the dry air system 20 into the membrane cartridge 16, a bypass line 33 routes dehumidified air around the flow control valve or orifice 18. The bypass line 33 includes a flow control valve or orifice 34 which allows a lower flow rate than does the flow control valve or orifice 18. The bypass line 33 also includes a check valve 36 which is placed between the flow control valve or orifice 34 and the membrane cartridge 16. The check valve 36 allows dehumidified air to flow from the dry air system 20 to the membrane cartridge 16, and prevents flow in the opposite direction. Likewise, a check valve 32 is placed between the flow control valve or orifice 18 and the dry air system 20 to allow dehumidified air to flow into the dry air system 20 and to prevent flow through the flow control valve or orifice 18 from the dry air system 20.

Therefore, dehumidified air from the membrane cartridge 16 flows through the flow control valve or orifice 18 and the check valve 32 into the dry air system 20 at a first flow rate when the compressor 12 is active. When the compressor 12 is inactive, dehumidified air from the dry air system 20 flows through the flow control valve or orifice 34 and check valve 36 into the membrane cartridge 16 at a second flow rate which is lower than the first flow rate. The second flow rate is preferably adjusted to maintain the membrane cartridge at its optimum efficiency without wasting dehumidified air by selecting the proper flow control valve or orifice 34. The desired air flow rate to be delivered by the flow control valve or orifice 34 is largely dependent upon the size of the membrane cartridge. Of course, since a small dry air system requires a smaller membrane cartridge than does a larger dry air system, the amount of flow required to keep the membrane cartridge active varies with the capacity of the dehumidifying system.

Figure 3:
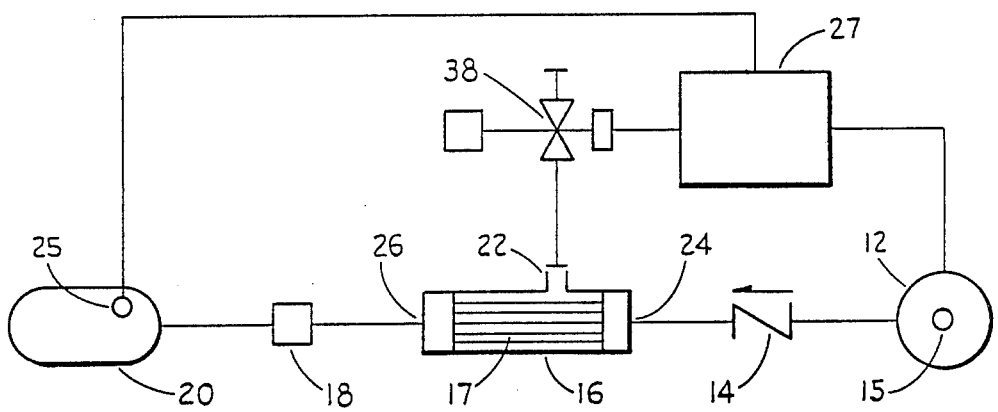
FIG. 3 is a diagrammatic illustration of a dehumidifier in accordance with the present invention which includes a secondary flow control device.

The flow of dehumidified air from the dry air system 20 into the membrane cartridge 16 can also be controlled by using the modified system illustrated in FIG. 3. As shown, the dehumidifying system of FIG. 1 is modified by adding a flow control valve 38 which controls the flow of air through the weep hole 22. The flow control valve 38 remains open while the compressor 12 is running so that water vapor easily escapes from the membrane cartridge 16 through the weep hole 22. However, when the compressor 12 is inactive, the flow control valve 38 reduces the flow of dehumidified air from the dry air system 20 through the membrane cartridge 16 as compared with the system of FIG. 1. Therefore, the control 27 adjusts the flow control valve 38 to optimize the flow of air from the dry air system 20 through the membrane cartridge 16.

Various methods may be used to control the valve 38. Preferably, the valve 38 is a proportional valve which is controlled by an electrical voltage delivered by the control 27. The voltage level adjusts the opening of the valve 38, and, thus, determines the amount of flow through the valve 38. When the compressor 12 is on, the voltage level causes the valve 38 to fully open so that water vapor easily escapes from the membrane cartridge 16. When the compressor 12 is off, the control 27 delivers a voltage to the valve 38 which causes the valve to restrict its flow in accordance with the amount of flow needed to keep the membrane cartridge 16 active without wasting dehumidified air delivered from the dry air system 20. For the maximum efficiency, the valve 38 is substantially closed immediately after the compressor 12 is turned off, because the membrane cartridge 16 has been recently active. As time passes, the control 27 slowly opens the valve 38 to allow air from the dry air system 20 to flow through the membrane cartridge 16. Advantageously, the valve 38 is opened only far enough to permit the minimum amount of flow required to keep the membrane cartridge 16 active while the compressor is off.

Alternatively, the valve 38 is of a type which is capable of being electrically actuated between open and closed positions. The control 27 delivers a voltage which maintains the valve 38 in an open configuration while the compressor 12 is active. When the compressor 12 becomes inactive, the control 27 delivers a voltage signal having a varying duty cycle to the valve 38 in order to sequentially open and close the valve 38. The duty cycle determines the amount of time that the valve is open and closed, and, therefore, controls the average flow rate through the valve 38.

Since some dry air systems cannot be sufficiently pressurized to provide an adequate backflow into the membrane cartridge, an auxiliary compressor may be used to provide flow into the membrane cartridge when the main compressor is off. As shown in FIG. 4, the dehumidifying system of FIG. 1 is modified by inserting a control valve 28 into the path between the flow control valve or orifice 18 and the dry air system 20. An auxiliary compressor 30, which is smaller than the compressor 12, is connected to the control valve 28.

When the compressor 12 is on, the control valve 28 allows the dehumidified air from the membrane cartridge 16 to pass into the dry air system 20. When the compressor 12 is off, a signal is delivered by the control 27 to turn on the auxiliary compressor 30 active and the control valve 28 routes pressurized air delivered by the auxiliary compressor 30 to the membrane cartridge 16. The control valve 28 also prevents the pressurized air delivered by the auxiliary compressor 30 from entering the dry air system 20 since the air has not been dehumidified. The air delivered by the auxiliary compressor 30 can flow into the outlet 26 or the inlet 24 of the membrane cartridge 16 and out through the weep hole 22, thereby maintaining the membrane cartridge 16 in an active state. The humidity level of the air within the dry air system 20 is preserved because air within the system is not being used to keep the membrane cartridge active.

Figure 5:
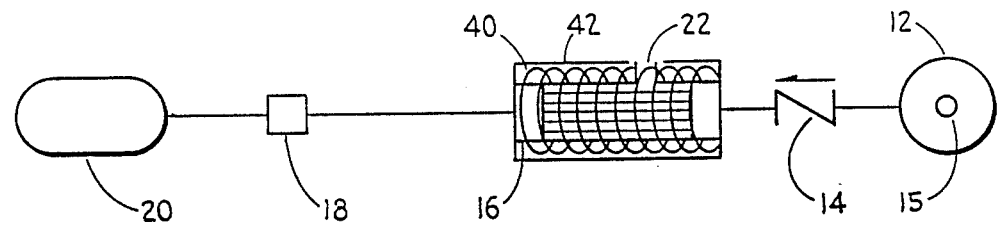
FIG. 5 is a diagrammatic illustration of a dehumidifier in accordance with the present invention which includes a heated membrane filter.

In addition to routing air back through the membrane cartridge 16, a heating coil 40 may be wrapped about the membrane cartridge 16 to further dry the fiber membranes 17 as shown in FIG. 5. A blanket of insulation 42 covers the heating coil 40 for efficient operation. The heating coil 40 raises the temperature of the fiber membranes 17 and, thus, drives off the remaining membrane condensate when they are unpressurized or exposed to a very small flow of air. The heating coil 40 can be used with any of the previously described embodiments, and will, in fact, reduce the minimum flow required to keep the membrane cartridge 16 active.

Figure 6:
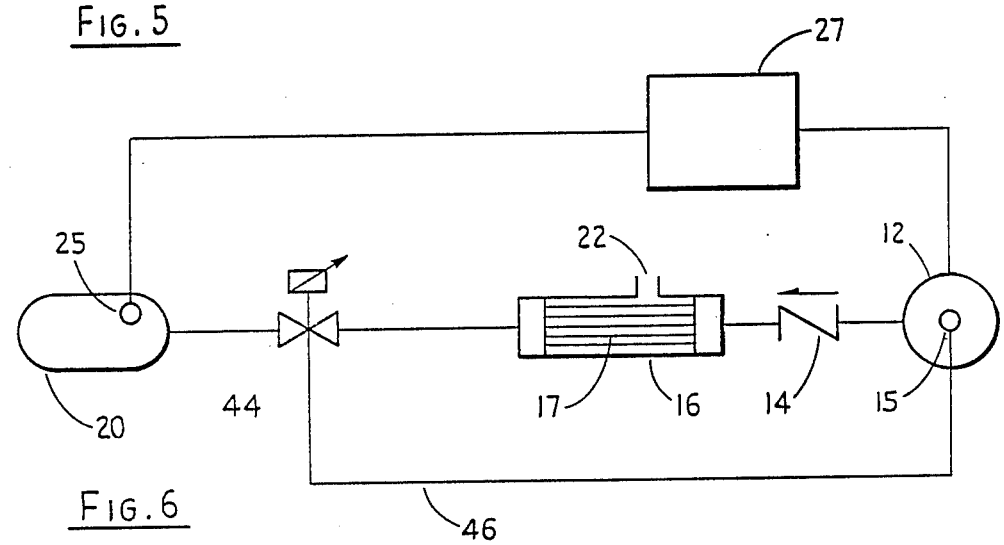
FIG. 6 is a diagrammatic illustration of a dehumidifier in accordance with the present invention which includes a flow bypass circuit.

The flow control valve or orifice 18 in any of the embodiments described above may be replaced by a flow control/bypass valve 44 which communicates to the inlet 15 of the compressor 12 via a line 46 as illustrated in FIG. 6. The valve 44 allows only air below a predetermined humidity level to flow through and into the dry air system 20. Air which is not dry enough bypasses the dry air system 20 and returns to the inlet 15 of the compressor 12 via the line 46. The compressor 12 then reinjects the air into the membrane cartridge 16 where the air is further dried and delivered once again to the flow control/bypass valve 44.

Although the invention has been described with particular reference to controlling the dew point of air, the invention is also applicable to other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane. The cartridge 22 must be provided with different membrane and/or treatment for certain of these gases, as described for example in U.S. Pat. Nos. 4,230,463; 4,472,175; 4,486,202; 4,575,385; 4,597,777; 4,614,524; 4,654,055 and 4,728,345.

We claim:

1. A method of dehumidifying gas comprising the steps of
    routing gas through a membrane cartridge for a first time period, said membrane cartridge having membranes which filter water vapor contained in said gas through said membranes, said membrane cartridge having a first outlet for ejecting dehumidified gas from said cartridge and a second outlet for ejecting water vapor from said cartridge;
    directing said dehumidified gas from said first outlet of said membrane cartridge into a dry gas system; and
    passing gas back into said membrane cartridge through said first outlet for a second time period after said first time period.

2. The method, as set forth in claim 1, further comprising the step of compressing said gas before it is routed through said membrane cartridge.

3. The method, as set forth in claim 1, wherein said dry gas system is pressurized by the introduction of said dehumidified gas into said dry gas system.

4. The method, as set forth in claim 3, wherein said first and second time periods are determined by measuring the pressure level within said dry gas system.

5. The method, as set forth in claim 4, wherein said routing step continues until the pressure level within said dry gas system rises above a first predetermined setpoint.

6. The method, as set forth in claim 5, wherein said passing step continues until the pressure level within said dry gas system falls below a second predetermined setpoint.

7. The method, as set forth in claim 1, wherein said step of passing includes passing gas from said dry gas system back into said membrane cartridge through said first outlet.

8. The method, as set forth in claim 1, wherein said step of passing includes passing gas from a compressor back into said membrane cartridge through said first outlet or said inlet.

9. The method, as set forth in claim 1, wherein said steps of routing and passing provide continuous gas flow through said membrane cartridge.

10. The method, as set forth in claim 1, wherein gas passing back into said membrane cartridge through said first outlet exits said membrane cartridge through said second outlet.

11. The method, as set forth in claim 1, wherein gas flow back into said membrane cartridge is the minimum required to keep said membrane cartridge operating at optimum efficiency.

12. The method, as set forth in claim 1, wherein said step of passing is controlled by at least one valve.

13. The method, as set forth in claim 12, wherein at least one of said valves is proportionally controlled between opened and closed positions.

14. The method, as set forth in claim 13, wherein flow through said at least one valve is the minimum required to keep said membrane cartridge operating at optimum efficiency.

15. The method, as set forth in claim 12, wherein at least one of said valves is repetitively opened and closed.

16. The method, as set forth in claim 15, wherein the average flow through said at least one valve is the minimum required to keep said membrane cartridge operating at optimum efficiency.

17. The method, as set forth in claim 12, wherein said at least one valve is operably positioned in said path between said first outlet of said membrane cartridge and said dry gas system.

18. The method, as set forth in claim 12, wherein said at least one valve is operably positioned at said second outlet of said membrane cartridge.

19. The method, as set forth in claim 1, wherein gas directed into said dry gas system and gas passing back into said membrane cartridge travel along different paths.

20. The method, as set forth in claim 1, further comprising the step of heating said membrane cartridge.

21. The method, as set forth in claim 1, wherein said step of directing includes
sensing the humidity of said dehumidified gas; and
recycling said dehumidified gas through said membrane cartridge if the humidity of said dehumidified gas is above a predetermined setpoint.

22. A method of dehumidifying gas within a waveguide comprising the steps of:
compressing gas for a predetermined period of time;
routing said compressed gas through a membrane cartridge in which membranes filter water vapor contained in said compressed gas through said membranes, said membrane cartridge having a first outlet for ejecting dehumidified gas from said membrane cartridge and a second outlet for ejecting water vapor from said membrane cartridge;
controlling the flow of dehumidified gas from said first outlet of said membrane cartridge into said waveguide; and
allowing dehumidified gas within said waveguide to flow back through said membrane cartridge after said predetermined period of time.

23. A method of dehumidifying gas within a waveguide comprising the steps of:
directing gas into a membrane filter which removes water vapor from said gas;
routing dehumidified gas from said membrane filter to said waveguide; and
allowing gas within said waveguide to pass back through said membrane filter in order to keep said membrane filter dry.

24. A method of dehumidifying gas for a dry gas system, said method comprising the steps of
producing dehumidified gas by directing pressurized gas through a membrane filter which removes moisture from said pressurized gas;
pressurizing said waveguide by delivering said dehumidified gas into a dry gas system;
discontinuing the production of dehumidified gas; and
allowing dehumidified gas within said dry gas system to flow back through said membrane filter.

25. A gas supply system for furnishing pressurized and dehumidified gas to a selected space, said system comprising
a primary gas source for supplying pressurized gas,
a membrane cartridge having an inlet for receiving said pressurized gas from said primary gas source and an outlet for supplying dehumidified, pressurized gas to said selected space, said cartridge having membranes which filter water vapor contained in said gas through said membranes, and a second outlet for ejecting water vapor from said cartridge,
control means for repetitively energizing and de-energizing said primary gas source so that said pressurized gas is supplied intermittently to said selected space, and
a secondary gas source for supplying gas to said membrane cartridge when said primary gas source is de-energized so as to maintain the effectiveness of said membranes during the periods of de-energization of said primary gas source.

26. The gas supply system of claim 25 wherein said selected space is a sealed space and said secondary gas source is the pressurized gas in said selected space.

27. The gas supply system of claim 25 wherein said primary gas source consumes substantially more energy, when energized, that said secondary gas source.

28. The gas supply system of claim 25 wherein said selected space is the interior of a waveguide system.

29. A gas dehumidifier comprising
membranes which filter water vapor contained in gas passed over said membranes, said membrane cartridge having an inlet for receiving gas to be dehumidified, a first outlet for ejecting dehumidified gas, and a second outlet for ejecting water vapor removed from said gas;
a dry gas system for receiving said dehumidified gas from said first outlet of said membrane cartridge; and
means for interrupting the supply of gas to said inlet after a first time period and passing gas back into said membrane cartridge through said first outlet for a second time period following said first time period.

30. The dehumidifier of claim 29 which includes means for compressing said gas before it is supplied to said inlet of said membrane cartridge.

31. The dehumidifier of claim 29 which includes means for determining said first and second time periods by measuring the pressure level within said dry gas system.

32. The dehumidifier of claim 29 which includes means for supplying gas to said inlet of said membrane cartridge until the pressure level within said dry gas system rises above a first predetermined setpoint.

33. The dehumidifier of claim 29 which includes means for supplying gas to said inlet of said membrane cartridge until the pressure level within said dry gas system falls below a second predetermined setpoint.

34. The dehumdifier of claim 29 which includes means for passing gas from said dry gas system back into said membrane cartridge through said first outlet.

35. The dehumidifier of claim 29 which includes means for passing gas from a compressor back into said membrane cartridge through said first outlet or said inlet.

36. The dehumidifier of claim 29 which includes valve means for controlling the passing of gas back through said membrane cartridge.

37. The dehumidifier of claim 36 wherein said valve means is proportionally controlled between opened and closed positions.

38. The dehumidifier of claim 36 wherein said valve means is repetitively opened and closed.

39. The dehumidifier of claim 36 wherein said valve means is positioned between said first outlet of said membrane cartridge and said dry gas system.

40. The dehumidifier of claim 29 which includes means for heating said membrane cartridge.

41. The dehumidifier of claim 29 which includes
means for sensing the humidity of said dehumidified gas; and
means for recycling said dehumidified gas through said membrane cartridge if the humidity of said dehumidified gas is above a predetermined setpoint.

42. A dehumidifier for a waveguide system comprising
a membrane filter for removing water vapor from gas;
means for routing gas through said membrane filter and then on to said waveguide system; and
means for allowing gas within said waveguide system to pass back through said membrane filter in order to keep said membrane filter dry.

* * * * *